United States Patent [19]
Dollar, II

[11] Patent Number: 5,590,012
[45] Date of Patent: Dec. 31, 1996

[54] ELECTRIC ARC DETECTOR SENSOR CIRCUIT

[75] Inventor: Charles R. Dollar, II, Norcross, Ga.

[73] Assignee: Siemens Energy & Automation, Inc., Alpharetta, Ga.

[21] Appl. No.: 413,304

[22] Filed: Mar. 30, 1995

[51] Int. Cl.⁶ .................................................. H02H 3/46
[52] U.S. Cl. .............................. 361/113; 361/85; 324/536
[58] Field of Search ...................................... 361/113, 110, 361/85; 324/536

[56] References Cited

U.S. PATENT DOCUMENTS

| | | |
|---|---|---|
| H536 | 10/1988 | Strickland et al. . |
| Re. 30,678 | 7/1981 | Van Zeeland et al. . |
| 2,808,566 | 10/1957 | Douma . |
| 3,471,784 | 10/1969 | Arndt et al. . |
| 3,588,611 | 6/1971 | Lambden et al. . |
| 3,622,872 | 11/1971 | Boaz . |
| 3,746,930 | 7/1973 | Van Best et al. . |
| 3,775,675 | 11/1973 | Freeze et al. . |
| 3,855,443 | 12/1974 | Bell, Jr. et al. . |
| 3,869,665 | 3/1975 | Kenmochi et al. . |
| 3,878,460 | 4/1975 | Nimmersjo . |
| 3,911,323 | 10/1975 | Wilson et al. . |
| 3,914,667 | 10/1975 | Waldron . |
| 4,047,235 | 9/1977 | Davis ........................ 361/100 |
| 4,115,828 | 9/1978 | Rowe et al. ................... 361/1 |
| 4,169,260 | 9/1979 | Bayer ........................ 340/562 |
| 4,214,210 | 7/1980 | O'Shea ....................... 455/282 |
| 4,245,187 | 1/1981 | Wagner et al. ................ 324/54 |
| 4,316,187 | 2/1982 | Spencer ...................... 340/664 |
| 4,376,243 | 3/1983 | Renn et al. ................... 219/514 |
| 4,387,336 | 6/1983 | Joy et al. .................... 324/51 |
| 4,402,030 | 8/1983 | Moser et al. .................. 361/93 |
| 4,466,071 | 8/1984 | Russell, Jr. ................. 364/492 |
| 4,639,817 | 1/1987 | Cooper et al. ................ 361/62 |
| 4,644,439 | 2/1987 | Taarning ..................... 361/87 |
| 4,658,322 | 4/1987 | Rivera ....................... 361/37 |
| 4,670,812 | 6/1987 | Doerfler et al. .............. 361/83 |

(List continued on next page.)

FOREIGN PATENT DOCUMENTS

| | | |
|---|---|---|
| 0488719 | 3/1992 | European Pat. Off. . |
| 9004278 | 4/1990 | WIPO . |
| 9208143 | 5/1992 | WIPO . |

OTHER PUBLICATIONS

"Detection of Arcing . . . " Electric Power Research Inst. EPRI EL-2757, Dec. 1982.

"Directional Coupler . . . " Alejandro Duenas J., RF Design, Feb. 1986, pp. 62–64.

"Directional Couplers" Antonio Paolantonio, RF Design, Sep./Oct. '79, 40–49.

Two-page European Search Report (No. EP 93 90 0627) dated Jul. 9, 1995.

Primary Examiner—Todd DeBoer

[57] ABSTRACT

A sensor arrangement for producing a signal representative of currents having frequencies and/or characteristics associated with arcing within an alternating current electrical system. The arrangement is coupled to an appropriate arc monitoring circuit which determines if the signal produced by the sensor is the result of arcing within the electrical system. One embodiment of the sensor arrangement includes an inductor, and a capacitor connected in series with the primary winding of a transformer. The inductor is typically connected in series with a phase conductor of the electrical system, and the capacitor and the primary winding are connected to the phase conductor in parallel to the inductor. Another embodiment of the sensor arrangement includes a capacitor and the primary winding of a transformer connected in series between the phase conductor of the electrical system and either a ground or neutral conductor of the system. For both embodiments of the sensor arrangement, the secondary windings of the transformers are connected to the arc monitoring circuit.

22 Claims, 3 Drawing Sheets

U.S. PATENT DOCUMENTS

| | | | |
|---|---|---|---|
| 4,697,218 | 9/1987 | Nicolas | 361/87 |
| 4,771,355 | 9/1988 | Emery et al. | 361/33 |
| 4,810,954 | 3/1989 | Fam | 324/142 |
| 4,853,818 | 8/1989 | Emery et al. | 361/33 |
| 4,858,054 | 8/1989 | Franklin | 361/57 |
| 4,922,368 | 5/1990 | Johns | 361/62 |
| 4,931,894 | 6/1990 | Legatti | 361/45 |
| 4,949,214 | 8/1990 | Spencer | 361/95 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,280,404 | 1/1994 | Ragsdale | 361/113 |
| 5,359,293 | 10/1994 | Boksiner et al. | 324/544 |
| 5,432,455 | 7/1995 | Blades | 324/536 |
| 5,434,509 | 7/1995 | Blades | 324/536 |

ELECTRIC ARC DETECTOR SENSOR CIRCUIT

FIELD OF THE INVENTION

The present invention relates to detecting, analyzing and responding to electric currents on a conductor at frequencies (secondary frequencies) different from the frequency (primary frequency) of the current for which the conductor is intended to conduct (i.e. 60 Hz current conducted within the electrical wiring of a building). In particular, the present invention relates to circuit arrangements for detecting the current and/or voltage of secondary frequencies representative of electric arcs.

BACKGROUND OF THE INVENTION

Various arc detection systems have been used in an attempt to detect arcing in the wiring of both residential and commercial buildings. It is recognized that arcs occurring between line and neutral or ground conductors can produce temperatures well above the ignition level of many common flammable materials, and therefore pose a significant fire hazard. For example, wiring with degraded or aged insulation and worn power cords in a home may arc sufficiently to start a fire.

Two basic types of arcing which are likely to occur in buildings are line fault arcing and contact arcing. An arc due to a line fault results from either a line-to-line short or a line-to-ground short. When a fault of this type occurs, the fault will draw current up to or beyond the capacity of the circuit, lights will dim indicating an excessive load is being drawn, and, if the associated circuit is protected by a circuit breaker, the circuit breaker will trip, interrupting the supply of power to the arc. Typically, these events will occurs in less than a second, and the arcing will have a duration insufficient to radiate or conduct substantial heat energy to the surrounding materials. Thus, the likelihood of fire is relatively low.

Contact arcing is commonly caused by use of worn electrical outlets, plugs and switches. As a result of such wear, these devices have insufficient current-carrying capacity for their originally intended purposes. For example, a plug may be subjected to a substantial number of heating cycles caused by resistance heating. This cycling gradually decomposes the insulating material around the contact area until material partially flows into the contact area thereby preventing proper electrical contact from being made at the plug. This process may become regenerative as the initial arcing produces more heat, thus, carbonizing the insulation, producing an insulating layer of the contact surfaces of the plug.

Other common sites of arcing are oxidized terminals, oxidized and worn switch contacts, and the interfaces between aluminum wiring and connection terminals made of dissimilar metals such as copper. The arcing which normally occurs under these circumstances is usually referred to as series arcing.

In view of the potential for arcing in the electrical systems of buildings, and the potential for devastating results thereof (i.e. building fires), a number of systems have been developed to detect arcing in building wiring. For example, U.S. Pat. No. 5,223,795, issued to Frederick K. Blades on Jun. 29, 1993, discloses a method and apparatus for detecting arcing in electrical connections by monitoring high frequency noise. The apparatus monitors high-frequency noise on the associated power line characteristic of arcing. One way the apparatus determines if arcing is present is to discriminate arcing noise from other high-frequency noise by determining if gaps in the noise occur every half-cycle of the power frequency.

Systems such as that disclosed in the '795 patent may operate effectively to detect arcing, but it would be desirable to improve the arc detecting capability of such systems so that the system can discriminate between different types of arcing and provide the ability to produce different responses to different types of arcing. Improvements in the performance can take a number of forms such as refining programming and refining interface circuitry to apply more accurate representations of signals monitored by the system. However, regardless of the quality of the system for monitoring and analyzing signals, the system will only produce arc protecting results as good as the systems ability to produce signals representative of the high frequency currents on the wiring being monitored. For example, current transformers are typically used to produce signals representative of the high frequency currents (desired signals) on the wiring being monitored. However, current transformers may incorporate signals representative of noise radiated onto the wires being monitored. In addition, a current transformer may also sense standing waveforms unrelated to the high frequency currents.

Accordingly, there is a need for improved sensors and circuitry for producing signals representative of the high frequency currents on the wiring being monitored by an arc detection system. In particular, there is a need for an improved sensor for use in the detection of series, line-to-neutral, line-to-ground and contact arcs which reduces or eliminates the sensing of standing waveforms.

SUMMARY OF THE INVENTION

One embodiment of an arc detection system according to the present invention operates to detect arcing within an alternating current electrical circuit. The electrical circuit conducts a desired alternating current at a primary frequency to an electric load. The system includes a first terminal, a second terminal, an inductor, a capacitor, a transformer, and an arc monitoring circuit. The inductor is coupled between the first and second terminals, the capacitor is electrically coupled to the first terminal, and the primary winding of the transformer is electrically coupled between the capacitor and the second terminal. The arc monitoring circuit is electrically coupled to the secondary winding of the transformer, and detects currents representative of arcing within the electrical circuit.

Another embodiment of the arc detection system does not include the inductor. This embodiment detects voltages having frequencies and characteristics representative of arcing within the electrical circuit. In particular, the capacitor and primary winding are connected series between a phase conductor and either the ground or the neutral conductor of the electrical system.

The present invention also provides a sensor useable in an arc detection system of the type for detecting arcing within an alternating current electrical circuit, where the electrical circuit conducts a desired alternating current at a primary frequency. The sensor includes first and second terminals, an inductor having a first impedance at the primary frequency and electrically coupled between the first and second terminals, and a capacitor having a second impedance at least 10,000 times the impedance of the inductor at the primary frequency and electrically coupled to the first terminal. The sensor also includes a transformer having a one-to-one turn ratio and including a primary winding magnetically coupled to a secondary winding, and having substantially the first impedance at the primary frequency. The primary winding is coupled between the capacitor and the second terminal such that the capacitor and primary winding are coupled in series between the first and second terminals, and the inductor is coupled between the terminals in parallel with the primary winding and the capacitor.

The present invention further provides a method for detecting a signal representative of arcing within an electrical circuit conducting a desired alternating current at a primary frequency. The method includes the steps of completing the electrical circuit with and inductor, electrically coupling a capacitor in series with a primary winding of a transformer further including a secondary winding, and electrically coupling the capacitor and primary winding into the electrical circuit in parallel with the inductor to limit current at the primary frequency from flowing through the primary winding. The method also includes the step of monitoring signals produced by the secondary winding to detect currents at frequencies different from the primary frequency and representative of arcing within the electrical circuit.

DETAILED DESCRIPTION OF THE PREFERRED EMBODIMENT

Figure 1:
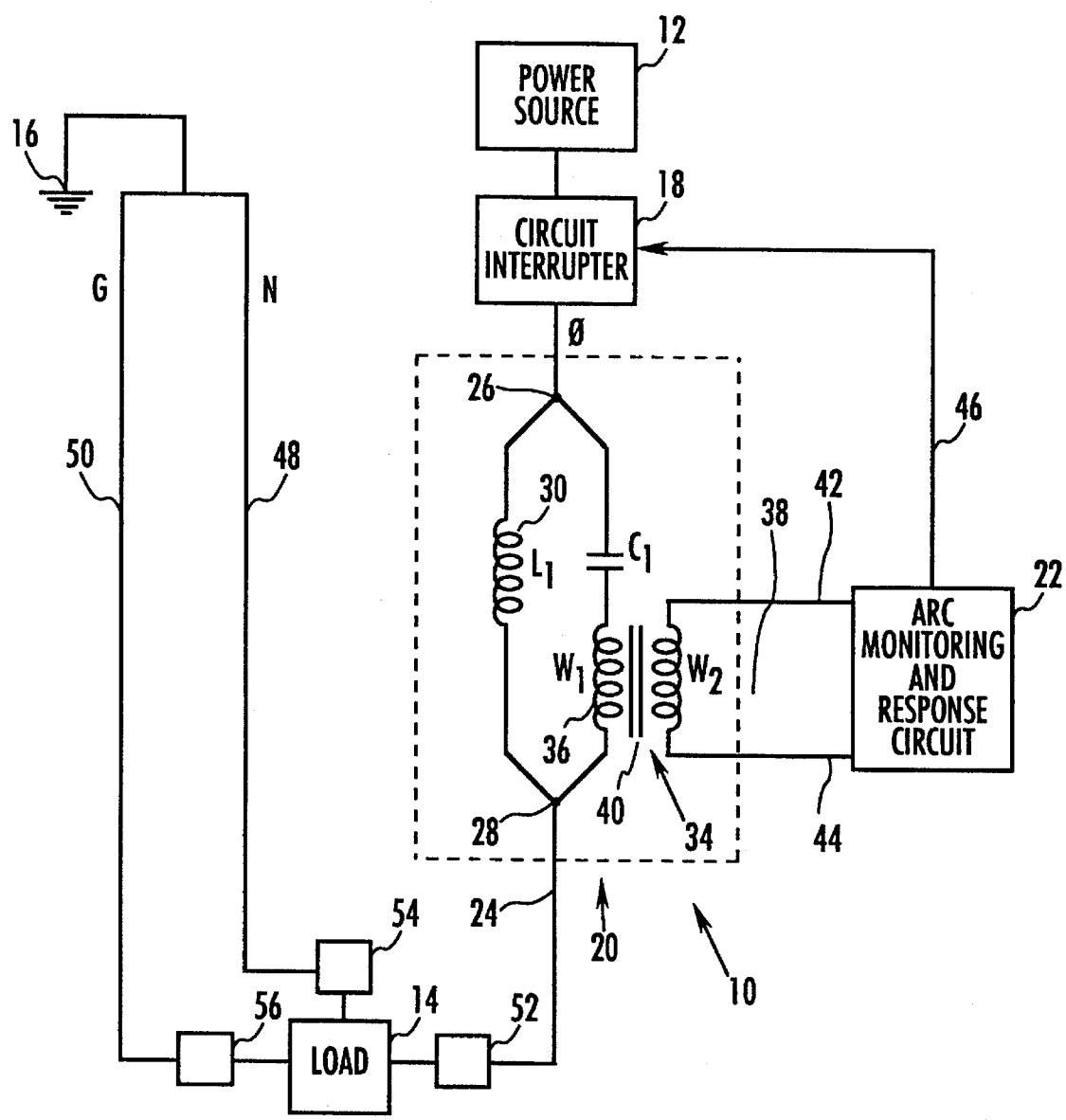
FIG. 1 is a schematic circuit diagram of a first embodiment of an arc detection system.

Referring to FIG. 1, an arc detection system 10 is configured to detect arcing such as line-to-line, line-to-ground, line-to-neutral or contact arcing. Arc detection is based upon monitoring the current in at least one of the conductors of an alternating current electrical circuit such as that schematically illustrated in FIGS. 1 and 2. These circuits, within which arcs are monitored, include an alternating current (AC) voltage power source 12, a load 14, a ground reference 16, and a circuit interrupter 18 (e.g., circuit breaker operable by a trip solenoid).

Arc detection system 10 includes a current sensor 20 and an arc monitoring and response circuit 22. In the present embodiment of system 10, current sensor 20 is connected in series with circuit interrupter 18 between power source 12 and load 14. Current sensor 20 includes a terminal 26, a terminal 28, an inductor 30, a capacitor 32, and a transformer 34. Transformer 34 includes a primary winding 36 ($W_1$) and a secondary winding 38 ($W_2$) which are magnetically coupled by a core 40. Inductor 30 is connected between terminals 26 and 28, and capacitor 32 is connected in series with primary winding 36 between terminals 26 and 28. Accordingly, capacitor 32 and primary winding 36 are connected in parallel between terminals 26 and 28 with inductor 30.

Arc monitoring and response circuit 22 is connected to secondary winding 38 by conductors 42 and 44. Transformer 34 provides isolation between conductor 24 and circuit 22, and also applies signals representative of the current in primary winding 36. Arc monitoring and response circuit 22 may be of the type disclosed in U.S. Pat. No. 5,223,795 issued to Frederick K. Blades on Jun. 29, 1993, the entire disclosure of which is incorporated herein by reference. As disclosed in the '795 patent, circuit 22 operates to produce a trip signal in response to the signal applied thereto on conductors 42 and 44. In general, circuit 22 is powered from phase conductor 24 and monitors the primary frequency for analyzing the non-primary frequency signals in phase conductor 24 to determine the presence of arcing. The trip signal is appropriately conditioned (e.g., amplified and isolated) by an appropriate control circuit within circuit 22 and then applied to a conductor 46 connected to circuit interrupter 18. Accordingly, when circuit 22 detects an undesirable arc based upon the signal produced by current sensor 20, a trip signal is applied to circuit interrupter 18, which disconnects power from power source 12 from load 14.

By way of example, the preferred embodiment of circuit 20 includes a transformer 34 having a one-to-one turn ratio and a ferrite core 40 for magnetically coupling windings 36 and 34. Furthermore, the impedances of inductor 30 and winding 36 may be chosen to be generally equal and in the range of 0.5 milliohms to 2 ohms at the operating frequency of the electrical circuit. More specifically, the arc detection system described above is typically used in building wiring circuits (i.e., residential or industrial) which are supplied alternating electrical current at 60 Hz. Accordingly, inductor 30 and winding 36 would have an impedance of 0.5 milliohms to 2 ohms at the primary frequency of 60 Hz.

Capacitor 32 operates to filter current at the primary frequency so this current is inhibited from flowing through winding 36. Accordingly, capacitor 32 is selected to have an impedance at 60 Hz which is in the range of 5,000 to 30,000 times as large as the impedance of inductor 30. For example, inductor 30 may have a value of 1.3 microhenries and capacitor 32 may have a value of 220 picofarads. (At $60H_z$ capacitor 32 has an impedence about 25,000 times that of inductor 30.) Inductor 30 is capable of carrying the full load current on conductor 24. The impedance of inductor 30 is low at the primary frequency of 60 Hz, but increases as the frequency of the current on conductor 24 increases. Thus, the high frequency components pass through the parallel path including capacitor 32 and winding 36. Capacitor 32 and winding 38 produce a band pass filter with a center frequency which may be in the range of 10 kHz to 1 gigahertz, but is preferably in the range of 5–30MHz. In general, the center frequency ($f_c$) is defined by the following equation:

$$f_c = [2 * \pi * (\text{Capacitance of capacitor } 32 * \text{Inductance of winding } 38)^{1/2}]^{-1}$$

In the present embodiment of arc detection system 10, circuit interrupter 18 is preferably a circuit breaker having a tripping coil which operates the circuit breaker in response to a trip signal applied to conductor 46. Additionally, current sensor 20 is preferably located in the phase conductor. However, there may be applications wherein sensor 20 is connected in series with the neutral conductor 48 or the ground conductor 50. Additionally, the circuit shown in FIG. 1 is a single-phase circuit. However, for a multi-phase circuit, a current sensor 20 could be coupled in all of the phase conductors thereof.

As generally discussed above, arc detection system 10 is configured to detect line-to-line, line-to-ground, line-to-neutral, and contact arcing. By way of specific example, load 14 is connected to phase conductor 24, neutral conductor 48 and ground conductor 50 by terminals 52, 54 and 56, respectively. Thus, in the circuit of FIG. 1, the potential for arcing is between conductors 24 and 48, 24 and 50, within terminal 52, within terminal 54, within terminal 56, and within load 14. Current sensor 20 is configured to produce signals representative of current frequencies related to these types of arcing without introducing spurious signals. Thus, this reduces the risk that arc monitoring and response circuit 22 will apply spurious signals to conductor 46, thereby producing unwanted circuit interruption by circuit interrupter 18.

Figure 2:
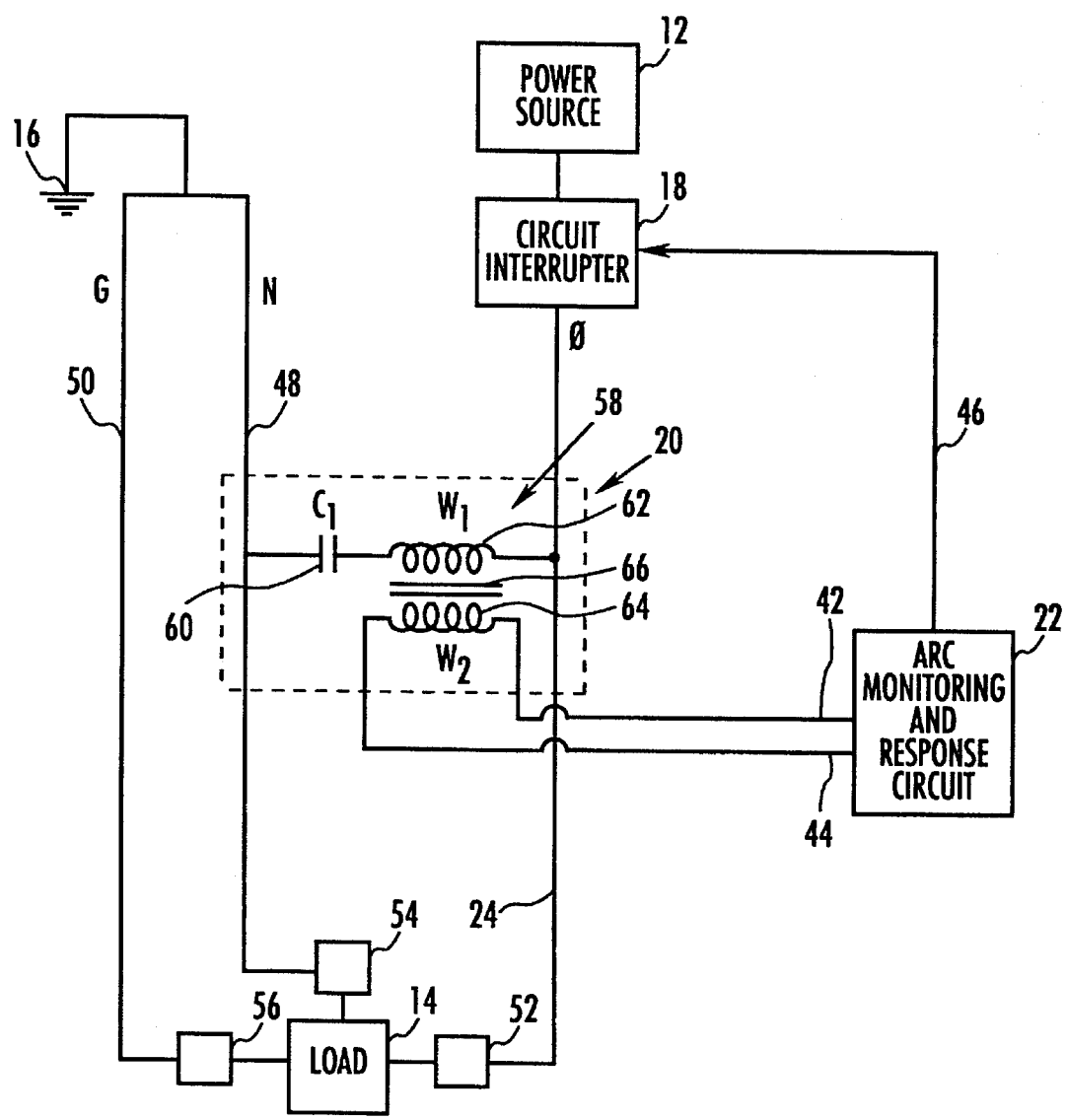
FIG. 2 is a schematic circuit diagram of a second embodiment of the arc detection system.

FIG. 2 illustrates a second embodiment of current sensor 20. In this embodiment, current sensor 20 is connected between conductor 24 and neutral conductor 48 or ground conductor 50. The second embodiment of current sensor 20 includes a transformer 58 and a capacitor 60. Transformer 58 includes a primary winding 62, a secondary winding 64, and a toroid core 66. Windings 62 and 64 are bifilar windings (i.e., wound as a pair of winding wires around core 66). Capacitor 60 and primary winding 58 are connected in series between phase conductor 24 and neutral conductor 48, as shown in FIG. 2.

Capacitor 60 and the inductance of winding 58 form a band-pass filter. Signals which may include components representative of arcing are coupled to secondary winding 64 to produce a voltage signal. By providing capacitor 60 a value of about 100 picofarads and winding 58 an inductance of about 1 microhenry, the transformer provides a center frequency between 16 and 17 MHz. In general, the embodiment of current sensor 20 illustrated in FIG. 2 permits system 10 to monitor arcing in an electric circuit based upon the voltage in the electric circuit, whereas the embodiment of current sensor 20 illustrated in FIG. 1 permits system 10 to monitor the electric circuit for arcing based upon current. Depending upon the specific application, either one or both of these sensors may be used to provide an optimal system for monitoring arcing.

Figure 3:
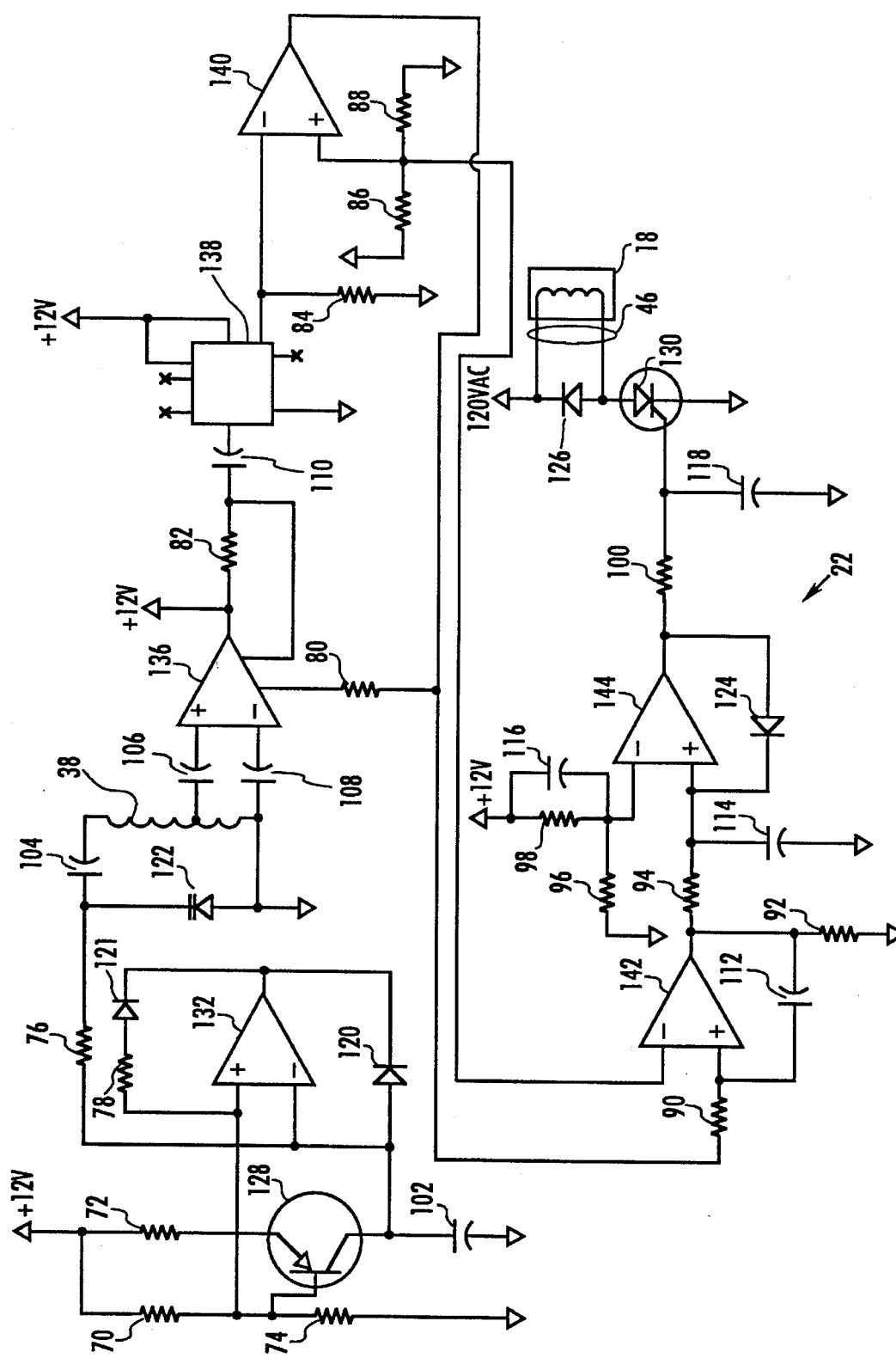
FIG. 3 is a circuit diagram for a second embodiment of an arc detection circuit.

Referring to FIG. 3, a second embodiment of arc monitoring and response circuit 22 includes resistors 70, 72, 74, 76, 78, 80, 82, 84, 86, 88, 90, 92, 94, 96, 98 and 100, capacitors 102, 104, 106, 108, 110, 112, 114, 116 and 118, diodes 120, 121, 122, 124 and 126, transistor 128, silicon controlled rectifier 130, comparator 132, winding 38 (or 58), radio frequency amplifier 136, low-level video detector 138, amplifier 140, amplifier 142, and amplifier 144 electrically connected as shown in FIG. 3. By way of example, the components of the second embodiment of circuit 22 may have the following characteristics:

| Resistor 70 | 15K ohms |
|---|---|
| Resistor 72 | 49K ohms |
| Resistor 74 | 100K ohms |
| Resistor 76 | 220K ohms |
| Resistor 78 | 100 ohms |
| Resistor 80 | 15K ohms |
| Resistor 82 | 1K ohms |
| Resistor 84 | 3.9K ohms |
| Resistor 86 | 20K ohms |
| Resistor 88 | 11.5K ohms |
| Resistor 90 | 10K ohms |
| Resistor 92 | 10K ohms |
| Resistor 94 | 107K ohms |
| Resistor 96 | 30.1K ohms |
| Resistor 98 | 9.09K ohms |
| Resistor 100 | 10K ohms |
| Capacitor 102 | .068 µF |
| Capacitor 104 | 1000 pF |
| Capacitor 106 | 220 pF |
| Capacitor 108 | 220 pF |
| Capacitor 110 | 220 pF |

-continued

| Capacitor 112 | .0027 µF |
|---|---|
| Capacitor 114 | .1 µF |
| Capacitor 116 | .1 µF |
| Capacitor 118 | 1 µF |
| Diode 120 | 1N4148 |
| Diode 121 | 1N4148 |
| Diode 122 | BB112 |
| Diode 124 | 1N4148 |
| Diode 126 | 1N4004 |
| Transistor 128 | 2N3906 |
| Comparator 132 | LT1017 |
| Amplifier 136 | MC1350P |
| Detector 138 | MC1330AP |
| Inverter 140 | LT1017 |
| Amplifier 142 | LMC662 |
| Amplifier 144 | LMC662 |

Transistor 128, comparator 132, diode 122, their associated components and winding 38 provide signal filtering. This filtered signal is applied to amplifier 136. Detector 138 produces a signal representative of an inverted envelope of the signal (high frequency arcing signal) produced at capacitor 110. This inverted signal is applied to amplifier 140 which inverts the signal and applies the signal to amplifiers 142 and 144, which cooperate with the associated circuitry to amplify the signal to a level in the range of 3–12 V and integrate the signal.

The amplified signal produced at the output of amplifier 142 is applied to an RC time delay including resistor 94 and capacitor 114. This time delay avoids the application of spurious triggering signals to SCR 130. When the voltage across capacitor 114 exceeds a predetermined triggering level, SCR 130 applies the 120 V AC signal to the tripping coil of circuit interrupter 18. Diode 124 latches the output integrating amplifier 144 during the positive and negative portions of the AC cycle of the current produced by power source 12. Accordingly, upon detection of an arc within phase conductor 24, the tripping coil of circuit interrupter 18 is energized, the contacts thereof are opened, and power from power source 12 is removed from load 14.

The preferred embodiment of the present invention has been disclosed by way of example and it will be understood that other modifications may occur to those skilled in the art without departing from the scope and spirit of the appended claims. For example, the values of the capacitances and inductances may be varied to accommodate primary frequencies other than 60 Hz (e.g., 50 Hz for European applications). Additionally, the core configuration of transformers 40 and 66 may also be modified to accommodate different applications. By way of further modification, the circuit of FIG. 2 may be modified by using 5.5 microhenry primary winding 62.

What is claimed is:

1. An arc detection system for detecting arcing within an alternating current electrical circuit, the electrical circuit conducting a desired alternating current at a primary frequency, the system, comprising:

a first terminal;

a second terminal;

an inductor electrically coupled between the first and second terminals;

a capacitor electrically coupled to the first terminal;

a transformer including a primary winding magnetically coupled to a secondary winding, the primary winding being electrically coupled between the capacitor and the second terminal; and an arc monitoring circuit electrically coupled to the secondary winding, the capacitor limiting current at the primary frequency from flowing through the primary winding, and the monitoring circuit detecting currents at frequencies different from the primary frequency and representative of arcing within the electrical circuit.

2. The system of claim 1, wherein the primary winding has an inductance substantially equal to the inductance of the inductor.

3. The system of claim 2, wherein the windings of the transformer include an equal number of turns in the winding conductors thereof.

4. The system of claim 3, wherein the capacitor has an impedance at least 25,000 times the impedance of the inductor at the primary frequency.

5. The system of claim 2, further comprising a ferrite core for magnetically coupling the primary and secondary windings.

6. The system of claim 4, further comprising a ferrite core for magnetically coupling the primary and secondary windings.

7. The system of claim 4, wherein the inductor and primary winding have impedances in the range of 0.25 milliohms to 1 milliohms at the primary frequency.

8. The system of claim 1, further comprising a circuit breaker of the type including a tripping coil, wherein the monitoring circuit is electrically coupled to the tripping coil and includes a control circuit for energizing the tripping coil if the monitoring circuit detects a current representative of arcing within the electric circuit.

9. A sensor useable in an arc detection system of the type for detecting arcing within an alternating current electrical circuit, where the electrical circuit conducts a desired alternating current at a primary frequency, the sensor comprising:

a first terminal;

a second terminal;

an inductor having a first impedance at the primary frequency and electrically coupled between the first and second terminals;

a capacitor having a second impedance at least 10,000 times the impedance of the inductor at the primary frequency, and electrically coupled to the first terminal; and a transformer having a one-to-one turn ratio and including a primary winding magnetically coupled to a secondary winding, the primary winding having substantially the first impedance at the primary frequency and being electrically coupled between the capacitor and the second terminal such that the capacitor and primary winding are coupled in series between the first and second terminals, and the inductor is coupled between the terminals in parallel with the primary winding and the capacitor.

10. The sensor of claim 9, further comprising a ferrite core for magnetically coupling the primary and secondary windings.

11. The sensor of claim 10, wherein the inductor and primary windings have impedances in the range of 0.25 milliohms to 1 milliohms at the primary frequency.

12. A method for detecting a signal representative of arcing within an alternating current electrical circuit, the electrical circuit conducting a desired alternating current at a primary frequency, the method comprising the steps of:

completing the electrical circuit with an inductor;

electrically coupling a capacitor in series with a primary winding of a transformer further including a secondary winding;

electrically coupling the capacitor and primary winding into the electrical circuit in parallel with the inductor to limit current at the primary frequency from flowing through the primary winding; and monitoring signals produced by the secondary winding to detect currents at frequencies different from the primary frequency and representative of arcing within the electrical circuit.

13. The method of claim 12, further comprising the step of setting the inductance of the primary winding substantially equal to the inductance of the inductor.

14. The method of claim 13, further comprising the step of providing equal numbers of turns on the primary and secondary windings.

15. The method of claim 14, further comprising the step of setting the impedance of the capacitor to at least 25,000 times the impedance of the inductor at the primary frequency.

16. The method of claim 15, further comprising the step of magnetically coupling the primary and secondary windings with a ferrite core.

17. The method of claim 12, further comprising the step of energizing a tripping coil of a circuit breaker if a current representative of arcing within the electric circuit is detected.

18. An arc detection system for detecting arcing within an alternating voltage electrical circuit including a phase conductor and a reference voltage conductor such as a ground conductor or a neutral conductor, the voltage on the phase conductor alternating between maximum and minimum voltages at a primary frequency, the system comprising:

a capacitor;

a transformer including a primary winding magnetically coupled to a secondary winding, the primary winding being electrically coupled in series with the capacitor, and the primary winding and capacitor being electrically coupled between the phase conductor and the reference voltage conductor; and an arc monitoring circuit electrically coupled to the secondary winding, the capacitor limiting current at the primary frequency from flowing through the primary winding, and the monitoring circuit detecting currents at frequencies different from the primary frequency and representative of arcing within the electrical circuit.

19. The system of claim 18, wherein the transformer includes a toroid core which magnetically couples the primary and secondary windings.

20. The system of claim 18, wherein the transformer includes a ferrite core which magnetically couples the primary and secondary windings.

21. The system of claim 18, wherein the windings of the transformer include an equal number of turns in the winding conductors thereof, and the winding conductors are bifilar.

22. The system of claim 18, further comprising a circuit breaker of the type including a tripping coil, wherein the monitoring circuit is electrically coupled to the tripping coil and includes a control circuit for energizing the tripping coil if the monitoring circuit detects a current representative of arcing within the electric circuit.

* * * * *

UNITED STATES PATENT AND TRADEMARK OFFICE
CERTIFICATE OF CORRECTION

PATENT NO. : 5,590,012
DATED : December 31, 1996
INVENTOR(S) : CHARLES R. DOLLAR, II It is certified that error appears in the above-identified patent and that said Letters Patent is hereby corrected as shown below:

Col. 4, line 32, correct "5,000" to --$5 \times 10^9$--;
Col. 4, line 32, correct "30,000" to --$30 \times 10^9$--;
Col. 4, line 36, correct "25,000" to --$25 \times 10^9$--;
Col. 7, line 12, correct "25,000" to --$25 \times 10^9$--;
Col. 7, line 39, correct "10,000" to --$10 \times 10^9$--; and
Col. 8, line 19, correct "25,000" to --$25 \times 10^9$--;

Signed and Sealed this

Ninth Day of September, 1997

Attest:

BRUCE LEHMAN

Attesting Officer

Commissioner of Patents and Trademarks